United States Patent
Teysseyre et al.

(10) Patent No.: US 9,254,596 B2
(45) Date of Patent: Feb. 9, 2016

(54) TOP GATE MOLD WITH PARTICLE TRAP

(75) Inventors: Jerome Teysseyre, Singapore (SG); Glenn de los Reyes, Singapore (SG)

(73) Assignee: STMICROELECTRONICS PTE LTD., Singapore (SG)

( * ) Notice: Subject to any disclaimer, the term of this patent is extended or adjusted under 35 U.S.C. 154(b) by 1051 days.

(21) Appl. No.: 13/340,319

(22) Filed: Dec. 29, 2011

(65) Prior Publication Data
US 2013/0168899 A1    Jul. 4, 2013

(51) Int. Cl.
*B29C 45/24* (2006.01)
*B29C 45/17* (2006.01)
*B29C 45/27* (2006.01)

(52) U.S. Cl.
CPC .............. *B29C 45/17* (2013.01); *B29C 45/2701* (2013.01); *B29C 45/1753* (2013.01)

(58) Field of Classification Search
CPC .............. B29C 45/14; B29C 45/14639; B29C 45/14655; B29C 45/2669; B29C 2045/2671
USPC ............ 264/272.11, 272.14, 272.17; 425/557
See application file for complete search history.

(56) References Cited

U.S. PATENT DOCUMENTS

| | | | |
|---|---|---|---|
| 5,876,765 A | | 3/1999 | Hinterlechner |
| 2008/0318051 A1* | | 12/2008 | Brown et al. ................. 428/409 |

* cited by examiner

*Primary Examiner* — Christina Johnson
*Assistant Examiner* — Xue Liu
(74) *Attorney, Agent, or Firm* — Seed IP Law Group PLLC

(57) ABSTRACT

A top-gate molding system for encapsulating semiconductor devices includes a plurality of mold cavities formed between a middle plate and a bottom plate, and a runner system formed between an upper plate and the middle plate. The runner system includes a runner with a plurality of reservoirs along its length, with a gate extending from each of the reservoirs to one of the cavities. A particle trap is positioned on the bottom of the runner between a sprue and a first one of the reservoirs, to capture contaminating particles in a flow of molding compound before the particles enter any of the reservoirs. The particle trap can be, for example, a notch or a channel extending transversely across the bottom of the runner, or a dummy reservoir upstream of the first of the plurality of reservoirs.

18 Claims, 4 Drawing Sheets

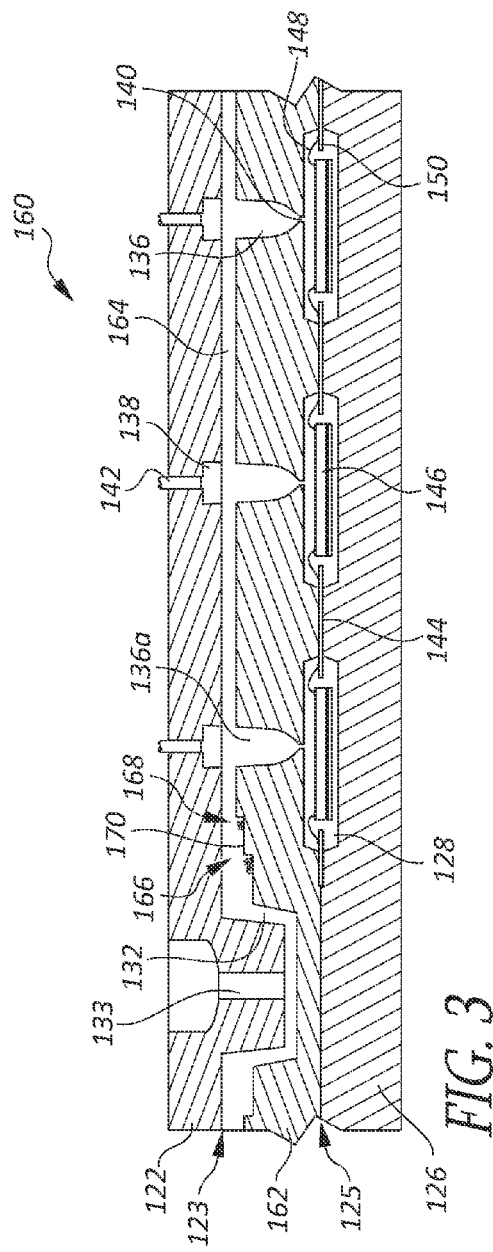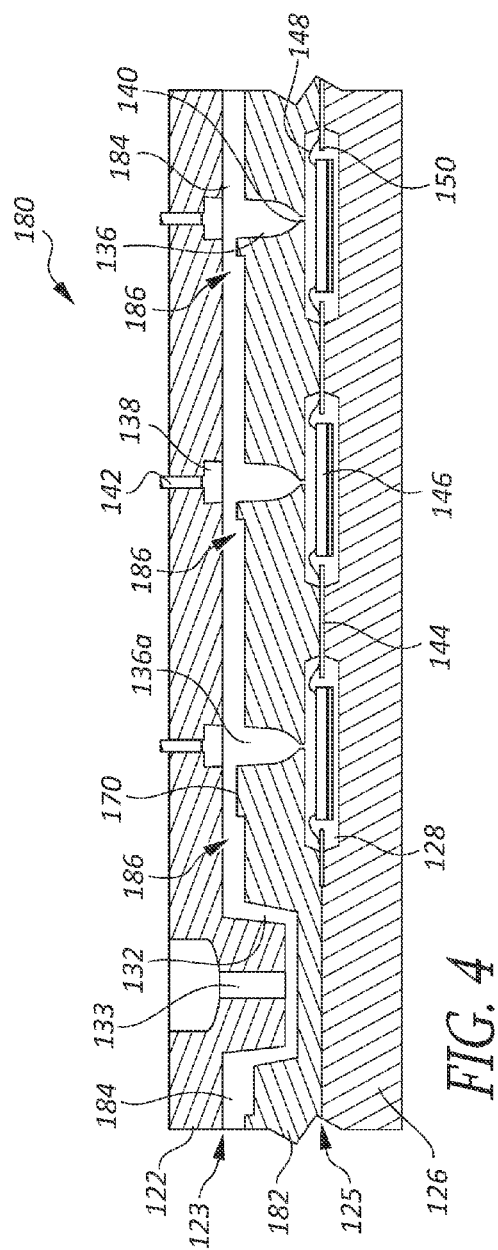

TOP GATE MOLD WITH PARTICLE TRAP

BACKGROUND

1. Technical Field

The embodiments of the present disclosure are related to the field of semiconductor packaging, and in particular to molds for encapsulating semiconductor devices in molding compound.

2. Description of the Related Art

The most common form of final packaging for semiconductor devices is a molded polymer case. Such packaging is used, for example, in traditional dual in-line (DIP) packages, dual and quad flat packs (DFP, QFP), and many others.

FIG. 1 is a simplified perspective view of a portion of the bottom plate 100 of a two-plate mold for encapsulating semiconductor devices. The plate 100 includes cavities 102 and a runner system 104 configured to deliver molding compound to the cavities. The runner system comprises a sprue 106, runners 108, and gates 110. In addition to the bottom plate 100 shown, a top plate with corresponding cavities is positioned above the bottom plate in a molding press, which is configured to move the top and bottom plates relative to each other during operation. The plane where the mold separates, at the faces of the top and bottom plates, is referred to as the parting line, indicated in FIG. 1 at 112.

Typically, semiconductor chips are mounted to a lead frame, with chip contacts wire bonded to fingers of the lead frame. One or both of the top and bottom plates are provided with depressions—not shown in FIG. 1—that correspond to the shape of the lead frame so that when a lead frame is positioned on the bottom plate 100, the plates can fully close over the lead frame.

In operation, the lead frame is positioned on the bottom plate 100 with the semiconductor chips positioned in the cavities 102. The top plate is then lowered onto the bottom plate 100, and molding compound is injected into the runner system 104 via the sprue 106. Molding compound flows from the sprue 106 to the runners 108, where it is distributed to the various cavities. The molding compound enters the cavities 102 via the gates 110, and flows over and around the semiconductor chips and those portions of the lead frame that are inside the cavity. A vent, not shown in FIG. 1, is provided to let gas and excess molding compound escape from the cavities 102. The molding compound in the cavities 102 and runner system 104 is cured, after which the plates are separated and the lead frame, with new packages attached, is removed from the mold. The lead frame and runner system element are then trimmed from the packages, usually leaving portions of the lead frame, in the form of contact pins, extending from the packages.

The molding system described above is referred to as a side-gate mold, because the gates 110 are positioned at the sides of the cavities 102, on the parting line between the top and bottom plates.

While the process described above has for years been adequate for most molded packaging requirements, recent developments in semiconductor technology have been found to be less compatible with the traditional processes. In particular, as circuit density has increased, the pitch of the circuit pads on many semiconductor chips has been significantly reduced, as compared to devices of a few years ago. This means that the bonding wires used to connect the chips to the lead frame fingers are also closer together. A 40 µm pad pitch is not uncommon, with bonding wires having diameters of around 10 µm. When such a device is positioned in a side-gate mold, the molding compound causes "wire sweep" as it flows across the cavity, in which the bonding wires are swept sideways, resulting in damage and short circuits.

In response to the increasing failure rate associated with packaging of high-density devices in side-gate molds, some manufacturers have begun to produce some packages in top-gate molds. FIGS. 2A and 2B are diagrammatical views, in cross-section, of a simplified example of a top-gate mold 120 used to package semiconductor devices. The mold 120 includes a top plate 122, a middle plate 124, and a bottom plate 126, configured to separate at top and bottom parting lines 123, 125. Cavities 128 are formed between the middle and bottom plates 124, 126, while a runner system 130 is formed between the top and middle plates 122, 124. The runner system 130 includes a sprue 132, a plurality of runners 134, reservoirs 136, reservoir locks 138, and gates 140. The top plate 122 also includes ejection pins 142. A portion of one runner 134 is shown in detail, but molds of the type shown can have many runners extending from a single frustoconically shaped sprue.

A lead frame 144 is also shown, with semiconductor chips 146 attached and positioned in the cavities 128. Wire bonds 148 couple the semiconductor chips 146 to lead frame fingers 150.

Typically, during operation, the top plate 122 remains stationary, while the middle and bottom plates 124, 126 move during each cycle. At the beginning of a cycle, a lead frame 144 is positioned on the bottom plate 126, which is then moved up against the middle plate 124, and both plates are moved up against the top plate 122. Molding compound is heated and introduced into the sprue 132 at a sprue bushing 133. The molding compound flows into the runners 134 and fills each reservoir 136 in turn. As the molding compound is filling the reservoirs, fluid pressure is relatively low, so very little of the viscous molding compound may pass the narrow gates 140. However, when the last reservoir is filled, fluid pressure increases, forcing the compound through the gates 140 and into the cavities 128. As molding compound flows into the runner system 130 and cavities 128, displaced air escapes through passages provided for that purpose, or via thin gaps between the plates. Because it flows into the cavities 128 from above the wire bonds 148, there is less of a tendency for the molding compound to sweep the wires out of position, so the failure rate is reduced, as compared to a side-gate mold system.

Once the cavities are filled, the molding compound in the cavities 128 and runner system 130 is cured, and the press is opened to remove the packages 129, as shown in FIG. 2B. First, the middle and bottom plates 124, 126 are separated from the top plate 122 at the first parting line 123. Most of the spaces in the mold 120 in which molding compound will be cured are provided with a draft. In other words, they have a taper that permits easy removal of the finished element from the mold. However, the reservoir locks 138 have sides that are substantially straight, or even slightly undercut, so the material that has hardened within the reservoir locks resists removal. Consequently, the runner system element 152 remains attached to the top plate 122, and the reservoir elements 137 and runner elements 135 are pulled from the middle plate 124 as the top and middle plates separate. This causes the molding compound reside 141 in the gates 140 to break, separating the runner system element 152 from the packages 129. After the runner system element 152 is separated from the packages 129, the ejector pins 142 move downward, ejecting the material from the reservoir locks 138 and separating the runner system element from the top plate 122. The middle and bottom plates 124, 126 also separate, and the lead frame is removed. Frequently, ejector pins are also provided in the bottom plate 126 to permit easy removal of the packages 129.

In the field of injection and transfer molding, there are two main classes of materials used to formulate molding compounds: thermoplastics, and thermosets. Thermoplastics are materials that soften or liquefy when heated, and harden when cooled. Thermoplastic materials can be remelted over and over again. In contrast, thermosetting materials require a curing process to harden, and once cured, cannot be remelted. When heated, they will decompose before they reach a melting temperature. Thermosets use a number of curing processes, depending on the material. Some thermosetting material is cured by heat, or a combination of heat and pressure; others employ a catalyst, exposure to a selected radiation (e.g., UV light), etc.

Of the two classes of materials, thermosets typically can be formulated to be stiffer and more rigid than thermoplastics, having a much higher modulus of elasticity. This is an important consideration in selecting the material for a molding compound for packaging semiconductor devices, because a semiconductor chip is relatively fragile, resembling an extremely thin piece of glass. Likewise, the bond wire connections that couple the chip to the lead frame fingers are also fragile. Flexure of the encapsulating material can break the chip or wires, or cause the wire connections to separate. Thus, molding compounds used to package semiconductor devices are generally thermosetting compounds having a very high modulus, to protect the underlying structure. Other considerations in formulating the compound include coefficient of thermal expansion; thermal conductivity; resistance to water, acids, and other chemicals; opacity to a broad spectrum of light and to other forms of radiation; etc. The intended operating conditions of a particular device will determine which factors are most relevant or important.

With regard to the design of the mold, there are a number of aspects that should be noted. Pressure drop from the sprue to the gate should be smooth and steady, without sudden changes; the surfaces of the runners should be perfectly smooth, with no unnecessary obstructions or changes in shape; and all of the cavities should fill at the same time, and under approximately equal pressure. These aspects are interrelated, and so must be considered together, in designing a mold. For example, a sudden high pressure drop in a runner can slow fluid flow at that point, causing downstream cavities to fill slowly or incompletely. Molding compound passing an unintended high-pressure choke point in a runner can generate heat and begin to cure prematurely. Surface textures or protruding features can create resistance to flow, and therefore increase pressure drop at that point. Additionally, such features can interfere with removal of the runner system element once curing is complete. Thus, runners are generally as short, smooth, and featureless as possible. If one cavity fills before the others, it can experience a higher pressure than the others, or can be under pressure for a longer duration. Differences in pressure and duration in the cavities can affect the cure rate, so that one or more of the packages could be under-cured or over-cured, in cases where packages are intentionally removed from the mold before they are fully cured. Excessive pressure in a mold cavity can also damage a semiconductor device.

In a mold like the one described with reference to FIGS. 2A and 2B, while molding compound is flowing, fluid pressure in the runners will drop along the length of each runner, so that the cavities nearest to the sprue will tend to experience higher pressure, and to be filled first, at least until the entire system is filled. This can be balanced by careful control of the gate diameters and runner dimensions. For example, by making the first gate diameter smaller than that of the next gate, which in turn is smaller than that of the third gate in line, etc., pressure drop at the first gate will be greater than at the second, offsetting the higher fluid pressure in the reservoir, so that pressure within the cavities is substantially equal. Additionally, the rheology of the uncured compound can be selected so that, once a reservoir is full, and while downstream reservoirs are still filling, the stillness of the fluid as it sits in the reservoir, and the relatively low pressure, permit the fluid to transition to a more viscous state. In this state, the compound does not immediately flow through the small gate orifice. However, once the last reservoir is filled and fluid pressure increases, the increased fluid pressure causes the thickened compound to begin to pass through the gate. The increased pressure together with the fast movement of the fluid through the gate cause the fluid to transition to a more liquid state. In the more liquid state, the molding compound is less likely to damage the chip, and especially the bonding wires, as it flows around the device to fill the cavity.

It can be seen that proper design of a runner system of a mold can be very challenging, and that accounting for and calculating the effects of all of the factors involved can be difficult or impossible. Mold designers tend therefore to be very conservative, avoiding any unnecessary or questionable features, changes in shape, or obstructions. When a runner system does not function properly, it can be extremely difficult to locate the cause. Sometimes, a problem in one part of a system is caused by a miscalculation related to an entirely different part of the system, in an area that appears to be operating perfectly.

BRIEF SUMMARY

A molding plate of a mold may be summarized as including: a sprue; an initial gate positioned to supply molding compound to a molding cavity; a runner in fluid communication with the sprue and the initial gate, and configured to carry molding compound from the sprue to the initial gate; and a particle trap in a bottom surface of the runner between the sprue and the initial gate.

The particle trap may include at least one step formed in the bottom surface of the runner. The particle trap may include a plurality of successive channels formed in the bottom surface of the runner and extending transverse to a direction of fluid flow in the runner. The initial gate may be one of a series of gates positioned along a length of the runner so that molding compound flowing in the runner to a succeeding one of the series of gates first passes the initial gate. The particle trap may be one of a plurality of particle traps, each positioned upstream of a respective one of the plurality of gates. The mold may include a reservoir coupled between the runner and the initial gate. The particle trap may be a dummy reservoir positioned along the runner between the sprue and the initial gate. The initial gate may be one of a plurality of gates positioned along a length of the runner, and the reservoir may be one of a plurality of reservoirs positioned along the runner, each reservoir coupled between the runner and a respective one of the plurality of gates. The initial gate may be one of a plurality of initial gates and the runner may be one of a plurality of runners, each coupled in fluid communication to a respective one of the plurality of initial gates and configured to carry molding compound from the sprue to the respective one of the plurality of initial gates, and the particle trap may be one of a plurality of particle traps, at least one of which is positioned in each of the plurality of runners between the sprue and the respective one of the plurality of initial gates.

A mold may be summarized as including an initial gate formed in a molding plate of the mold and positioned to supply molding compound to a molding cavity; a runner coupled to the initial gate and configured to carry molding compound from a sprue to the initial gate; and means for trapping contaminating particles entrained in a flow of molding compound before the contaminating particles reach the initial gate.

The means for trapping may include an element positioned on a bottom surface of the runner and configured to interfere with the flow of molding compound along the bottom surface so that particles that are heavier than the molding compound remain upstream of the element. The means for trapping may include one or more notches formed in the bottom surface.

A mold may be summarized as including a plurality of molding plates; a plurality of cavities formed between two of the plurality of molding plates, each of the plurality of cavities configured to receive a semiconductor device coupled to a leadframe; and a runner system formed in an upper one of the two of the plurality of molding plates, the runner system including: a sprue, a plurality of runners coupled to the sprue, a plurality of first reservoirs, each coupled to a respective one of the plurality of runners, a plurality of initial gates, each coupled to a respective one of the plurality of first reservoirs and configured to receive a flow of molding compound from the sprue, via the respective ones of the plurality of runners and the plurality of first reservoirs, each of the plurality of initial gates configured to transmit molding compound from the respective one of the plurality of first reservoirs to a top of a respective one of the plurality of cavities, and a plurality of particle traps, each positioned on a bottom surface of a respective one of the plurality of runners upstream of the respective one of the plurality of initial gates.

The runner system may include a respective plurality of gates positioned downstream of each of the plurality of initial gates along the corresponding one of the plurality of runners. Each of the plurality of particle traps may include a feature configured to interfere with movement of contaminating particles along the bottom surface of the respective one of the plurality of runners. Each of the plurality of particle traps may include one or more element formed on the bottom surface of the respective one of the plurality of runners and selected from among a groove, a ridge, a notch, and a dummy reservoir.

A method may be summarized as including introducing a thermosetting compound into a sprue of a mold; flowing the compound from the sprue along a runner to a molding cavity, via a reservoir coupled to the runner and an initial top gate extending between the reservoir to the molding cavity; and trapping contaminating particles entrained in the compound flow before the contaminating particles reach the initial top gate.

The trapping contaminating particles may include flowing the compound over an obstruction positioned at a bottom of the runner so that contaminating particles that are heavier than the compound are prevented from advancing along the bottom of the runner.

BRIEF DESCRIPTION OF THE SEVERAL VIEWS OF THE DRAWINGS

FIG. 3 is a diagrammatic cross section of a top-gate mold according to one embodiment.

FIGS. 4-7 are diagrammatic cross sections of molds according to respective additional embodiments.

DETAILED DESCRIPTION

Figure 1:
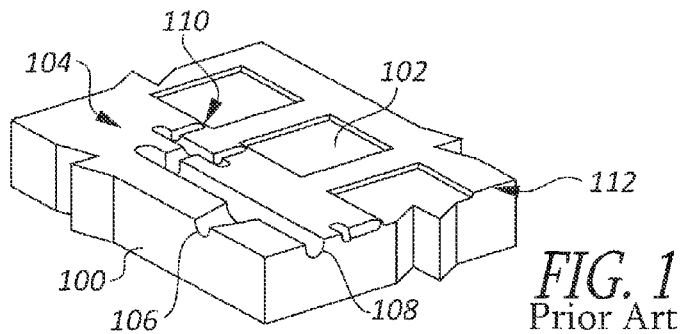
FIG. 1 is a simplified perspective view of a portion of the bottom plate of a two-plate mold for encapsulating semiconductor devices, according to known art.

The inventors are employed in the field of semiconductor packaging. For many of the reasons described in the background, they began using a top gate mold design to package some high-density semiconductor devices, using molds that are functionally similar to the mold 120 described in the background with reference to FIGS. 2A and 2B. Converting to a top gate system was generally successful in addressing the original problems, but they encountered a different problem. Intermittently, one or two of the cavities would fail to fill, so that when the mold was opened, the lead frame and semiconductor chip within that cavity would be completely bare and exposed. This usually occurred in a cavity nearest to the sprue, but not necessarily in the same runner each time.

As previously noted, such problems can be very difficult to locate, because every element of a runner system affects the overall balance, so if the problem is related to the balance of fluid pressure in the system, the immediate cause may not be directly or obviously associated with the non-filling cavities, especially in view of the fact that it was not the same cavity affected each time. Furthermore, the problem might instead be related to the viscosity, rheology, or temperature of the compound, or the speed of the plunger used to drive the compound into the sprue, etc.

After extensive testing and investigation failed to locate or resolve the problem, the inventors surmised that the problem might be related to contaminants in the molding compound. To investigate this possibility, following a normal production cycle, a translucent melamine resin-based compound was introduced into the mold and cured—it will be recalled that molding compounds used in semiconductor packaging are almost universally black or very dark grey or brown. Upon inspection, small dark-colored particles could be distinguished along the bottoms of some of the runners, especially between the sprue and the first reservoir.

Subsequent inspection of the mold showed that following a production cycle, small fragments of dust and cured compound material remained in the mold. The inventors theorized that this material, mostly bits of flash, breaks from the runner system as it is removed from the mold. Because the cured compound is denser than the uncured compound, it sinks, and so tends to drop into the first reservoir, even as compound continues to flow past the first reservoir to fill other reservoirs. Furthermore, because compound initially does not flow, or flows only slowly through the first gate, the contaminating particles, which might individually pass through the gate without any ill effect, instead settle to the bottom of the reservoir, where they form a tangled mass that blocks the gate.

This issue would not be a significant problem in other kinds of molded products because most other products do not require the same high modulus of elasticity. They are therefore less brittle, and small bits are less likely to break away from the runner system element. Additionally, in the case of thermoplastics, such material would re-melt when reheated by the hot compound in a succeeding shot, and so would not tend to block a gate. The issue would also not be a problem in more traditional side-gate molds, because the particles of cured compound would not settle directly over the gate, and so, even if they did move with the fluid flow to the gate, they would do so individually, and would therefore be less likely to actually block the flow.

Turning now to FIG. 3, a diagrammatic cross section of a mold 160 is shown, according to an embodiment. The mold 160 is similar in design to the mold 120 of FIGS. 2A and 2B, but the principles disclosed can be applied in top-gate molds of other designs as well.

In addition to elements previously described, the mold 160 includes a middle plate 162 that comprises a plurality of runners 164, a plurality of reservoirs and gates 136, 140, and a particle trap 166 configured to capture particle contaminants 168 before they enter the first reservoir 136a.

In the embodiment of FIG. 3, the particle trap 166 comprises at least one notch, or step 170 extending across a bottom surface of the runner 164, transverse to a direction of fluid flow, between the sprue 132 and the first reservoir 136a. FIG. 3 shows two of the steps 170, but, depending on design considerations, one step or more than two steps can be used. While the steps 170 are shown as having substantially vertical risers, these can be angled slightly to ease removal of the runner system element from the middle plate 162 at the end of a cycle.

During operation, molding compound introduced into the sprue flows past the particle trap 166. Contaminating particles that are heavier than the uncured compound sink to the bottom of the runner, and are trapped by the steps 170 of the particle trap 166 before the fluid flow reaches the first reservoir 136a. Thus, few or none of the particles are moved into the first reservoir, thereby reducing or eliminating the problem of blockage of the first gate 140.

Figure 5:
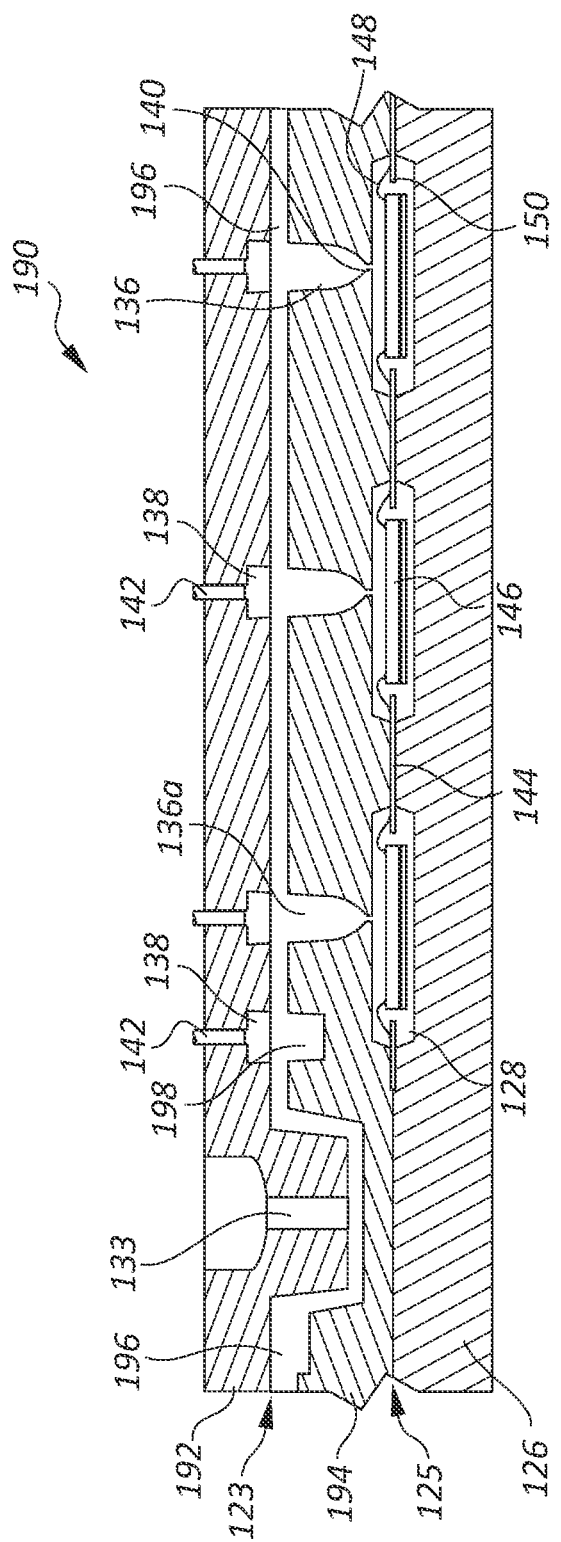
Figure 6:
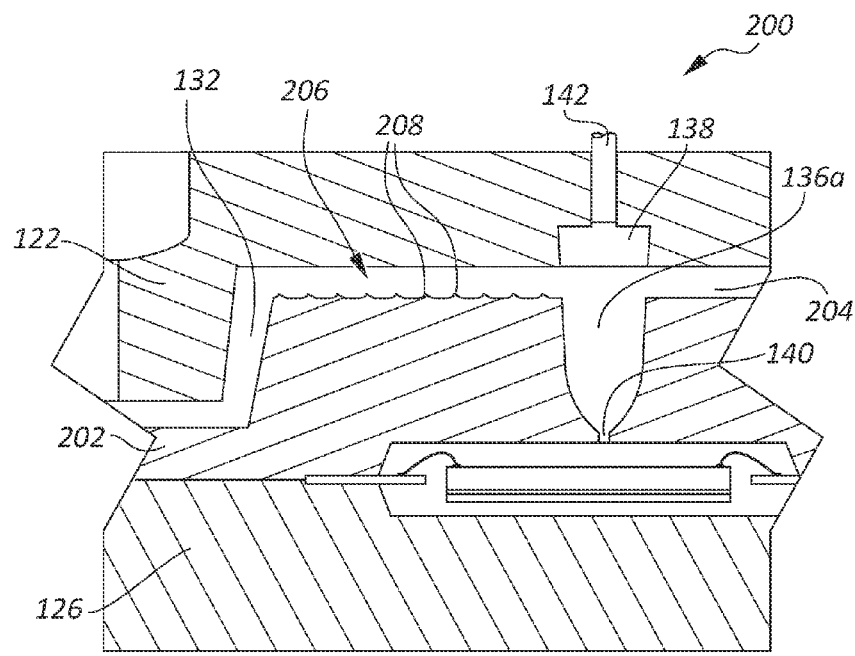

FIGS. 4-6 show diagrammatic cross sections of molds 180, 190, and 200, according to respective embodiments. The mold 180 of FIG. 4 includes a middle plate 182 that comprises at least one runner 184, and extending along the runner, a plurality of reservoirs and gates 136, 140. The middle plate 182 also comprises a plurality of particle traps 186, each positioned in a bottom surface of the runner 184 directly upstream from a respective one of the plurality of reservoirs 136.

Each of the particle traps 186 is shown as comprising at least one step 170, substantially as described with reference to the particle trap 166 of FIG. 3, but this is merely exemplary. Other structures that serve a similar function can also be used.

In operation, particulate contaminants that pass one of the plurality of reservoirs 136, or that are introduced downstream of a preceding reservoir, are trapped by the respective particle trap 186 before reaching the next reservoir.

The mold 190 of FIG. 5 includes a top plate 192 and a middle plate 194 that comprises at least one runner 196, and extending along the runner, a plurality of reservoirs and gates 136, 140. Additionally, a dummy reservoir 198 is provided, positioned between the sprue 132 and the first reservoir 136a. The dummy reservoir is not coupled to a corresponding gate, but instead serves as a particle trap capable of receiving a relatively much larger quantity of contaminating particles than other traps disclosed herein. The top plate 192 comprises an additional reservoir lock 138 and ejection pin 142 positioned over the dummy reservoir 198, to facilitate removing the dummy reservoir element from the dummy reservoir 198 at the end of each cycle.

FIG. 6 shows a portion of the mold 200 in an enlarged view, relative to the views of the molds of FIGS. 3-5. The mold 200 of FIG. 6 includes a middle plate 202 that comprises at least one runner 204, and extending along the runner, a plurality of reservoirs and gates 136, 140. A particle trap 206 is positioned in a bottom surface of the runner 204 between the sprue 132 and the first reservoir 136a. The particle trap 206 comprises a series of transverse channels, defined by a plurality of small ridges 208 positioned between the channels and extending transversely across a bottom surface of the runner 204. During a molding cycle, contaminating particles are captured as they pass, with the larger number of ridges 208 compensating for the relatively smaller size of each, as compared to other embodiments.

Figure 7:
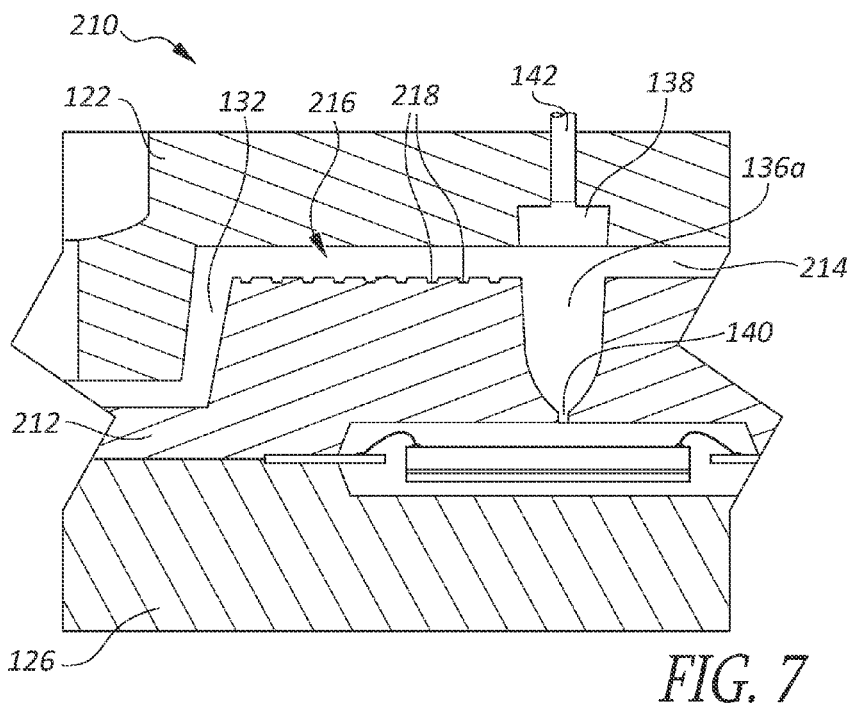

FIG. 7 shows an embodiment that is similar to that of FIG. 6, in which a mold 210 includes a middle plate 212 having at least one runner 214, and extending along the runner, a plurality of reservoirs and gates 136, 140. A particle trap 216 is positioned in a bottom surface of the runner 214 between the sprue 132 and the first reservoir 136a. Like the embodiment of FIG. 6, the particle trap 216 comprises a series of transverse channels, in this case defined by a plurality of grooves 218 formed in the bottom of the runner 214 and extending transverse thereto. The grooves 218 function in a manner similar to the ridges described with reference to the mold 200 of FIG. 6.

Once the molding process is complete, if a cavity remains unfilled, it can be difficult and expensive to separately encapsulate a single semiconductor device. Worse, in cases where a portion of a cavity fills before the gate is blocked, cured molding compound can be in a position, within the partially filled cavity, that prevents additional molding compound from being able to completely encapsulate the semiconductor device without the manufacture of a purpose-made mold. In either case, it may be more costly to finalize the encapsulation than the device is worth, notwithstanding the large investment represented by a high-density semiconductor chip and the associated wire bonds and lead frame. Thus, practice of the principles disclosed can provide a substantial financial savings and reduction in product rejection. It should also be noted that implementation of the principles in new product molds can be done at substantially no expense, requiring, in most cases, only the inclusion of appropriate particle traps in the design of the middle plate, so that when the plate is made, the particle traps are formed at the same time as the other features of the plate. In the case of an existing mold, only a modest modification of the middle plate is necessary. Modifications of equivalent complexity are routine and relatively inexpensive. Accordingly, potentially significant benefit can be obtained at little or no added cost, by practice of the disclosed principles.

While the inventors recognize that the particle traps disclosed in each of the various embodiments will have some effect on pressure drop in the respective runners, they note that, with the exception of the embodiment of FIG. 4, all of the particle traps are positioned upstream of the respective first reservoir. Thus, the effects on fluid pressure will impact each of the gates of the respective runner substantially equally. It is therefore believed that no effect on the pressure balance of the respective runner system will occur, and that there will be no changes necessitated by the addition of particle traps. It is expected that if any change is required, it will be limited to a slight increase in the supply pressure of the molding compound to compensate for the additional pressure drop across the traps.

With regard to the embodiment of FIG. 4, it is noted that each of the reservoirs is preceded by an identical particle trap. Thus, it is believed that any effects on the pressure balance by the additional traps will substantially cancel each other.

Nevertheless, the principles of the invention are not limited to embodiments in which the effects on pressure drop are equal or balanced, but extend also to particle trap systems that affect pressure and flow resistance to different degrees at different locations of a runner system. This is because it is believed that the impact of the deliberate introduction of a well defined structure into a system that is otherwise balanced can be calculated or measured and compensated, without undue experimentation.

The drawings are not intended to accurately depict a particular mold design, inasmuch as many details that are unnecessary to a disclosure of the inventive principles are omitted, and the features that are shown may not be presented to scale. However, those of ordinary skill in the art will easily recognize how to adapt the disclosed principles for use in particular systems.

Ordinal numbers are used in the specification and claims to distinguish between elements so referenced. In the claims, there is no necessary significance to the value of a number assigned to one element relative to other numbered elements. Furthermore, an ordinal number used to refer to an element in the claims does not necessarily correlate to a number used to refer to an element in the specification on which the claim reads. However, with reference to some recited elements, the location of those elements relative to other similar elements is important to the scope of the claim. In particular, where the claims make reference to an element that is further upstream than any other similar elements on a given runner, that element will be referred to as the initial element, to avoid confusion with the ordinal first, which, as used in the claims does not imply such a limitation. Where a claim uses the term initial to refer to a claim element, this does not require that the referenced element be one of a plurality of such elements on a runner, but it does require that if there are additional such elements, the referenced element must be upstream of any others of the elements.

The terms top and bottom are used to refer to an element or portion of an element as it would be oriented during normal operation. Thus, reference to a bottom surface of a runner refers to the surface of the runner that would be lowermost during a molding cycle of the plate in which it is formed.

Except where further defined, particle trap is used as a generic term to refer to any structure that serves the corresponding function of capturing contaminating particles entrained in a flow of molding compound.

The principles described herein are not limited to injection molding systems, but can also be used in other systems, including transfer molding systems.

Figure 2A:
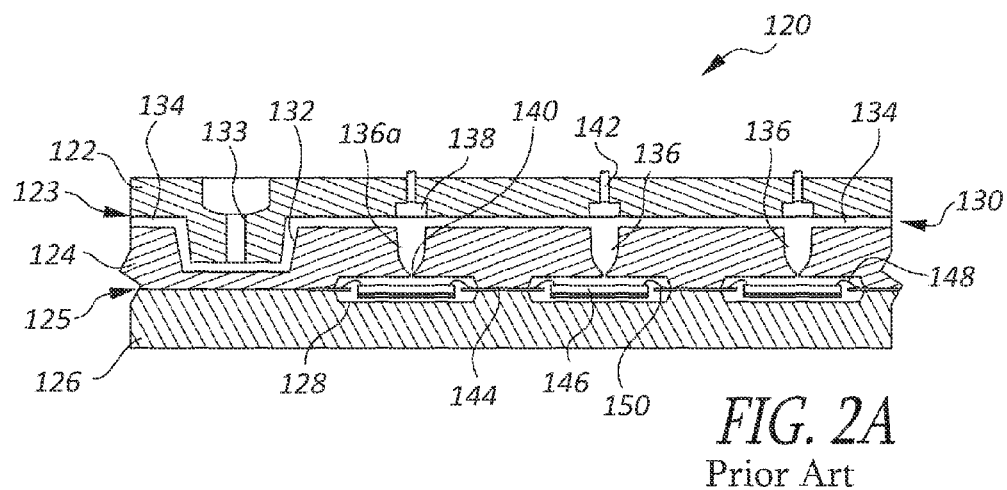
FIG. 2A is a diagrammatical view, in cross-section, of a simplified example of a known top-gate mold used to package semiconductor devices.
Figure 2B:
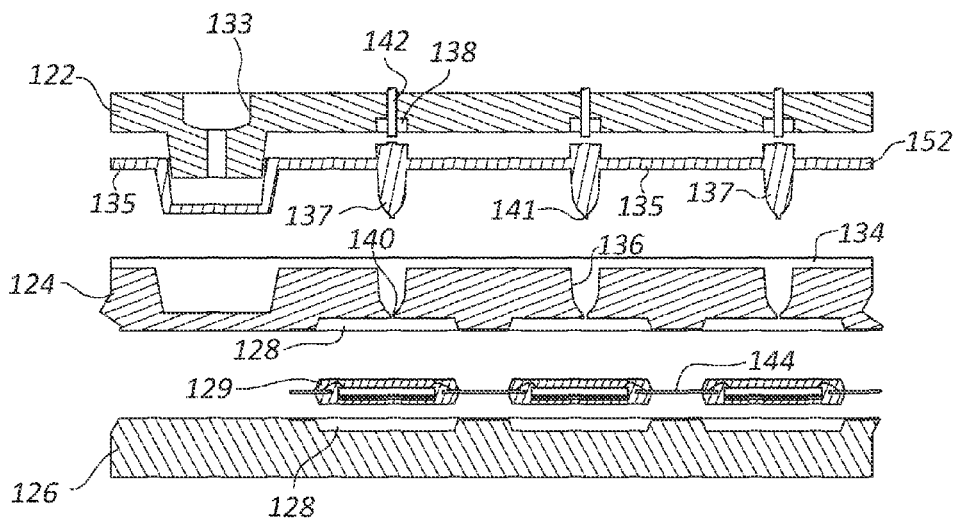
FIG. 2B is a similar view of the mold of FIG. 2A, showing the mold with its plates separated and the molded elements separated from the plates.

In the fields of molding and mold making, it is very common to use the same term to refer to a feature formed in a molding plate as well as to an article formed by that feature. For example, each of the terms sprue, reservoir, and runner is regularly used in the art to refer to a negative shape formed in a molding plate, and also to an article that is formed by the respective shape when the plate is used in a molding process. Thus, the feature referenced by 134 in FIG. 2A is a runner, as is the feature referenced by 135 in FIG. 2B. Typically, the meaning of such terms is clear from the context. However, in the present disclosure, if such a term is followed by the term element, as in, e.g. "a runner element," the term refers specifically to the article formed, and if the term is followed by the term channel, as in "a sprue channel," the term refers specifically to the shape formed in the plate. In such cases, the terms element and channel are used merely a clarifiers, and should not be construed as they would be if used in other contexts. Likewise, other terms used to refer to features or shape of a mold may also be used to refer to a corresponding formed article, and will be treated similarly.

Molding compounds are typically composite materials made from blends of ingredients such as, e.g., resins, hardeners, silicas, catalysts, pigments, and release agents, and are generally provided in a substantially liquid form of a selected viscosity so that they can be injected or poured. Molding compounds are available in a very wide range of formulations from different manufacturers and to meet many different criteria. Accordingly, the term molding compound is to be construed broadly to apply to all such compounds.

In the drawings, where letters are combined with reference numbers, e.g., 136a, the letters are not intended to indicate an element that is functionally or structurally distinct from other elements that are indicated by the same number, but are provided where the description points to one or more specific ones of a plurality of like elements.

The unit symbol "µm" is used herein to refer to a value in microns. One micron is equal to $1 \times 10^{-6}$ meters.

Modulus of elasticity is a variable that describes the stiffness of a material, i.e., the relationship of stress (applied force) to strain (resulting deformation) within the material's range of elastic response, i.e., the range in which the material returns to its original shape when the stress is removed. Thus, in a material having a high modulus of elasticity, a large amount of applied force is required to produce a small amount of deformation.

The term couple, as used in the claims, includes within its scope indirect coupling, such as when two elements are coupled with one or more intervening elements, even where no intervening elements are recited.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A mold, comprising:
a molding plate, including:
 a sprue;
 an initial gate positioned to supply molding compound to a molding cavity;
 a runner in fluid communication with the sprue and the initial gate, and configured to carry molding compound from the sprue to the initial gate; and
 a particle trap in a bottom surface of the runner between the sprue and the initial gate.

2. The mold of claim 1 wherein the particle trap comprises at least one step formed in the bottom surface of the runner.

3. The mold of claim 1 wherein the particle trap comprises a plurality of successive channels formed in the bottom surface of the runner and extending transverse to a direction of fluid flow in the runner.

4. The mold of claim 1 wherein the initial gate is one of a series of gates positioned along a length of the runner so that molding compound flowing in the runner to a succeeding one of the series of gates first passes the initial gate.

5. The mold of claim 4 wherein the particle trap is one of a plurality of particle traps, each positioned upstream of a respective one of the plurality of gates.

6. The mold of claim 1, comprising a reservoir coupled between the runner and the initial gate.

7. The mold of claim 6 wherein the particle trap is a dummy reservoir positioned along the runner between the sprue and the initial gate.

8. The mold of claim 6 wherein the initial gate is one of a plurality of gates positioned along a length of the runner, and the reservoir is one of a plurality of reservoirs positioned along the runner, each reservoir coupled between the runner and a respective one of the plurality of gates.

9. The mold of claim 1 wherein the initial gate is one of a plurality of initial gates and the runner is one of a plurality of runners, each coupled in fluid communication to a respective one of the plurality of initial gates and configured to carry molding compound from the sprue to the respective one of the plurality of initial gates, and the particle trap is one of a plurality of particle traps, at least one of which is positioned in each of the plurality of runners between the sprue and the respective one of the plurality of initial gates.

10. A mold, comprising:
an initial gate formed in a molding plate of the mold and positioned to supply molding compound to a molding cavity;
a runner coupled to the initial gate and configured to carry molding compound from a sprue to the initial gate; and
a trap positioned within the runner and prior to the initial gate, the trap preventing contaminating particles entrained in a flow of molding compound from reaching the initial gate when the molding compound is carried through the runner and over the trap prior to arriving at the initial gate.

11. The mold of claim 10 wherein the trap comprises an element positioned on a bottom surface of the runner and configured to interfere with the flow of molding compound along the bottom surface so that particles that are heavier than the molding compound remain upstream of the element.

12. The mold of claim 11 wherein the trap comprises one or more notches formed in the bottom surface.

13. A mold, comprising:
a plurality of molding plates;
a plurality of cavities formed between two of the plurality of molding plates, each of the plurality of cavities configured to receive a semiconductor device coupled to a leadframe; and
a runner system formed in an upper one of the two of the plurality of molding plates, the runner system including:
a sprue,
a plurality of runners coupled to the sprue,
a plurality of first reservoirs, each coupled to a respective one of the plurality of runners,
a plurality of initial gates, each coupled to a respective one of the plurality of first reservoirs and configured to receive a flow of molding compound from the sprue, via the respective ones of the plurality of runners and the plurality of first reservoirs, each of the plurality of initial gates configured to transmit molding compound from the respective one of the plurality of first reservoirs to a top of a respective one of the plurality of cavities, and
a plurality of particle traps, each positioned on a bottom surface of a respective one of the plurality of runners upstream of the respective one of the plurality of initial gates.

14. The mold of claim 13 wherein the runner system comprises a respective plurality of gates positioned downstream of each of the plurality of initial gates along the corresponding one of the plurality of runners.

15. The mold of claim 13 wherein each of the plurality of particle traps comprises a feature configured to interfere with movement of contaminating particles along the bottom surface of the respective one of the plurality of runners.

16. The mold of claim 13 wherein each of the plurality of particle traps comprises one or more element formed on the bottom surface of the respective one of the plurality of runners and selected from among a groove, a ridge, a notch, and a dummy reservoir.

17. A top-gate mold, comprising:
a molding plate, including:
a sprue;
an initial gate positioned atop a molding cavity to supply molding compound downwardly into the molding cavity;
a runner in fluid communication with the sprue and the initial gate, and configured to carry molding compound from the sprue to the initial gate; and
a particle trap in a bottom surface of the runner between the sprue and the initial gate such that the molding compound is carried over the particle trap in the runner prior to arriving at the initial gate.

18. The top-gate mold of claim 17, wherein the molding plate further comprises:
at least one other gate positioned along a length of the runner after the initial gate; and
at least one other particle trap in the bottom surface of the runner, each positioned in the runner prior to a respective one of the at least one other gate and after an adjacent gate upstream from the respective gate.

* * * * *